UNITED STATES PATENT OFFICE.

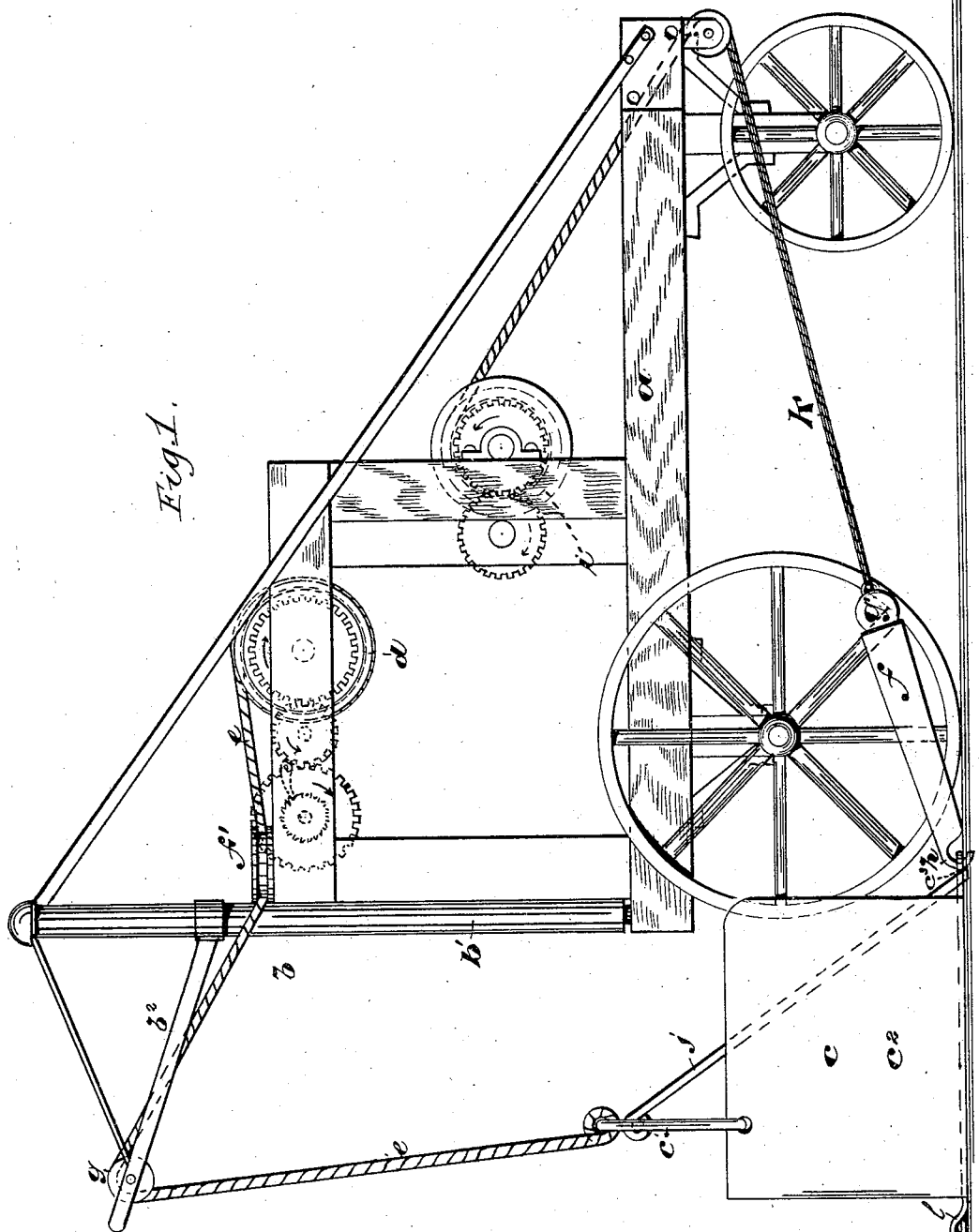

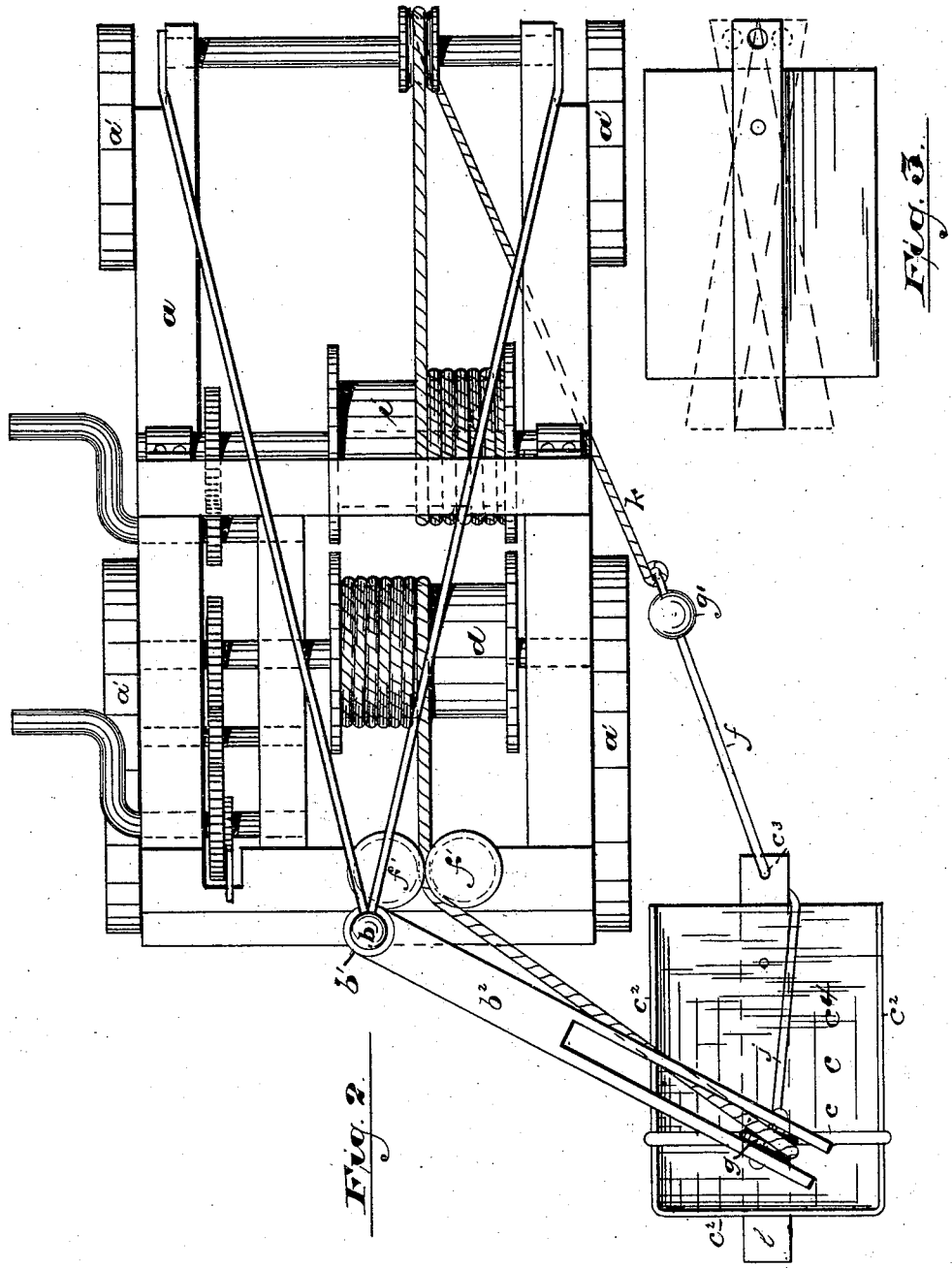

JOHN P. LUYSTER, OF NEW YORK, N. Y.

APPARATUS FOR LOADING SNOW.

SPECIFICATION forming part of Letters Patent No. 370,345, dated September 20, 1887.

Application filed May 27, 1887. Serial No. 239,520. (No model.)

*To all whom it may concern:*

Be it known that I, JOHN P. LUYSTER, a citizen of the United States, residing at New York, in the county of New York and State of New York, have invented certain new and useful Improvements in Apparatus for Loading Snow; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to facilitate the process of removing snow from streets in cities after the same has been piled or thrown in heaps at the sides of the car-tracks by the improved scraping and heaping device, for which a contemporaneous application has been filed, or by the ordinary snow plows and scrapers, such as are now employed for removing the snow from the said tracks.

The invention consists in the improved shoveling and hoisting or loading device, hereinafter described, and finally set forth in the clauses of the claim.

Referring to the accompanying drawings, in which like letters of reference indicate corresponding parts in each of the several figures, Figure 1, Sheet 1, is a side elevation of the improved device. Fig. 2, Sheet 2, is a plan of the same; and Fig. 3 is a detail plan of the improved shovel.

In said drawings $a$ indicates a truck or carriage of any suitable construction, having wheels $a'$, whereby it may be drawn conveniently through the streets from one place to another by horses or steam, but preferably by the former.

$b$ is a derrick, of which $b'$ is a standard or post, arranged in any suitable position upon the body of the truck, and adapted to turn pivotally thereon and cause the arm $b^2$ to carry the shovel $c$ laterally to any suitable position near the carriage to enable the shovel to action with the heap of snow.

$d$ is a drum, operated by a suitable crank or other mechanism to be actuated by hand or steam power, over which the hoist rope or chain $e$ is wound. Said rope is passed between guide-wheels $f'$ over a suitable sheave or pulley, $g$, in the said arm $b^2$, and from this to the bail, handle, or cross-bar $c'$ of the shovel. By turning the drum $d$, by means of a crank or other mechanism, the drum is turned, and the said shovel is raised from the ground to the cart or lowered from the latter to the former. The shovel $c$ is preferably of sheet metal, consisting of a suitable bottom, $c^4$, and three side plates, $c^2 c^2 c^2$, the fourth side or end of the shovel being open to receive the snow. At the said open end of the shovel the bottom is provided with a loop or eye, $c^3$, by means of which suitable tacklings can be coupled to the said shovel at said bottom and be drawn horizontally through the snow, so that said heap will at one draft be entirely shoveled up and the street cleared thereof.

To enable the hoist rope or tackling $e$, by means of which the said shovel is drawn horizontally through the heap, to be coupled to the bottom of the shovel, I have provided a plate or blade, $f$, of sufficient length to pass entirely through the heap. Said plate is weighted, as at $g'$, at one end, and provided with a hook, $h$, or other suitable coupling device, by means of which the said plate or blade may be coupled to the eye $c^3$ at the bottom of the shovel. At the weighted end the said plate is secured to the draft-rope $k$ in any ordinary manner. The workman, when operating the device, brings the shovel to the side of the heap of snow and couples the plate or blade to the same. The workman then forces the said plate-edge forward through the center of the heap, the weight being efficient in enabling or helping the said plate to pass downward therethrough. The draft-rope $k$ is then attached to the weighted part of the plate or blade and to the drum $i$ on the carriage in any suitable position thereon, and the latter is turned by means of a crank, by hand-power, or by means of steam, or in any other suitable manner, so that the shovel is caused to pass horizontally or approximately horizontally through the heap and to scoop up the same. By centrally opening the heap by means of the plate or blade $f$, I am enabled to secure a straight draft on the bottom of the shovel, as will be apparent upon reference to Fig. 1.

When the shovel is filled in this manner, the weighted plate is detached from the shovel, and rod $j$, connected with the bail or handle $c'$ at one end, is hooked or otherwise secured upon the edge of the shovel or to the eye $c^3$, but preferably to the loop $c^3$, to hold the shovel in a position to retain the snow while elevating the same. The drum $d$ is then turned, and the shovel raised by means of the hoist-rope $e$ to the cart, at which point the rod $j$ is disconnected from the edge of the shovel by means of a catch-rod, $l$, which may be a continuation of the eye $c^3$, and passes beneath the shovel to the point of attachment of the rod $j$ with the shovel, so that said shovel is overbalanced and allows the snow to drop into the cart. The arm $b^2$ is turned pivotally upon the post $b$, when lateral draft is brought to bear on the shovel and hoist-rope in guiding the said shovel to the desired position. The drums $i$ and $d$ and the hoisting mechanism in general may be of any suitable construction and arrangement to enable me to raise the snow, and I do not wish to be understood as limiting myself to the exact construction shown.

Having thus described the invention, what I claim as new is—

1. In combination, in a snow-removing device, a shovel and a plate adapted to pass centrally through the heap of snow, the draft devices secured to the forward end of the blade of said shovel, and mechanism, substantially as described, for drawing said shovel horizontally through or beneath said heap, substantially as and for the purposes set forth.

2. In a snow-removing device, in combination, a shovel and a weighted plate or blade adapted to pass through the heap of snow, whereby the draft upon the shovel may be brought horizontally in line with the bottom of said shovel, substantially as and for the purposes set forth.

3. In combination, a carriage, a derrick carried thereby, a shovel connected to said derrick by an elevating-rope, a blade for centrally opening the heap to secure a straight draft at the bottom of the shovel, and a draft-rope and means, substantially as described, for drawing the shovel through said heap, substantially as set forth.

In testimony that I claim the foregoing I have hereunto set my hand this 7th day of April, 1887.

JOHN P. LUYSTER.

Witnesses:
OLIVER DRAKE,
OSCAR A. MICHEL.